US009774022B2

(12) United States Patent
Shitamichi et al.

(10) Patent No.: US 9,774,022 B2
(45) Date of Patent: Sep. 26, 2017

(54) WIRING MODULE

(71) Applicants: SUMITOMO WIRING SYSTEMS, LTD., Yokkaichi-shi, Mie (JP); HONDA MOTOR CO., LTD., Tokyo (JP)

(72) Inventors: Masaru Shitamichi, Yokkaichi (JP); Yoshinao Kobayashi, Yokkaichi (JP); Yuko Kinoshita, Yokkaichi (JP); Tomomi Kurita, Wako (JP); Yusuke Ozaki, Wako (JP); Nobuaki Ishibashi, Wako (JP)

(73) Assignees: SUMITOMO WIRING SYSTEMS, LTD., Mie (JP); HONDA MOTOR CO., LTD., Tokyo (JP)

( * ) Notice: Subject to any disclaimer, the term of this patent is extended or adjusted under 35 U.S.C. 154(b) by 140 days.

(21) Appl. No.: 14/897,053

(22) PCT Filed: May 29, 2014

(86) PCT No.: PCT/JP2014/064215
§ 371 (c)(1),
(2) Date: Dec. 9, 2015

(87) PCT Pub. No.: WO2014/203699
PCT Pub. Date: Dec. 24, 2014

(65) Prior Publication Data
US 2016/0133905 A1 May 12, 2016

(30) Foreign Application Priority Data

Jun. 18, 2013 (JP) ................................. 2013-127906

(51) Int. Cl.
H01M 2/20 (2006.01)
H01G 2/04 (2006.01)
(Continued)

(52) U.S. Cl.
CPC .............. *H01M 2/204* (2013.01); *H01G 2/04* (2013.01); *H01G 11/08* (2013.01);
(Continued)

(58) Field of Classification Search
None
See application file for complete search history.

(56) References Cited

U.S. PATENT DOCUMENTS

| 9,672,961 | B2* | 6/2017 | Ogasawara | ............ H01M 2/10 |
| 2013/0052513 | A1 | 2/2013 | Ogasawara et al. | |
| 2013/0062098 | A1 | 3/2013 | Ikeda et al. | |
| 2014/0113494 | A1 | 4/2014 | Kinoshita et al. | |
| 2014/0315441 | A1 | 10/2014 | Kinoshita et al. | |

FOREIGN PATENT DOCUMENTS

| JP | H08-77913 A1 | 3/1996 |
| JP | 2006-269103 A | 10/2006 |

(Continued)

OTHER PUBLICATIONS

May 19, 2016 Office Action issued in Japanese Patent Application No. 2013-127906.
(Continued)

*Primary Examiner* — Patrick Ryan
*Assistant Examiner* — Christopher Domone
(74) *Attorney, Agent, or Firm* — Oliff PLC

(57) ABSTRACT

A wiring module includes an insulating protector. The insulating protector includes a main body and a lid. The main body includes a holding portion that holds at least one of an element connecting member and an external connecting member. The lid is attached to the main body. The lid swings between an open position and a closed position. The holding portion is open at the open position and closed at the closed position. The lid includes a shaft for detachable attachment. The main body includes a shaft holder that receives the shaft and holds the shaft such that rotation of the shaft is allowed. The main body includes a restriction portion to hold the lid to the main body such that the swing of the lid is restricted between the open position and the closed position. The lid includes a restriction portion receiving portion that receives the restriction portion.

3 Claims, 10 Drawing Sheets

(51) Int. Cl.
*H01G 11/08* (2013.01)
*H01M 2/10* (2006.01)
*H01G 11/10* (2013.01)

(52) U.S. Cl.
CPC ......... *H01M 2/1077* (2013.01); *H01M 2/206* (2013.01); *H01G 11/10* (2013.01); *H01M 2220/30* (2013.01); *Y02E 60/13* (2013.01); *Y02T 10/7022* (2013.01)

(56) References Cited

FOREIGN PATENT DOCUMENTS

| | | | |
|---|---|---|---|
| JP | 2011-233333 | A | 11/2011 |
| JP | 2012-243647 | A | 12/2012 |
| JP | 2012-252781 | A | 12/2012 |
| JP | 2013-016381 | A | 1/2013 |
| JP | 2013-033707 | A | 2/2013 |
| JP | 2013-062122 | A | 4/2013 |
| JP | 2013-105587 | A | 5/2013 |
| WO | 2012/160981 | A1 | 11/2012 |

OTHER PUBLICATIONS

Jul. 22, 2014 International Search Report issued in International Patent Application No. PCT/JP2014/064215.
Jul. 22, 2014 Written Opinion issued in International Patent Application No. PCT/JP2014/064215.

\* cited by examiner

WIRING MODULE

TECHNICAL FIELD

The present invention relates to a wiring module.

BACKGROUND ART

A battery module installed in an electric vehicle or a hybrid vehicle generally includes a number of electricity storage elements connected in series via connecting members.

Such a battery module includes groups of electricity storage elements and a wiring module (see Patent Literature 1). The wiring module includes the connecting members, sensor terminals, and an insulating protector. The connecting members connect the electricity storage elements to one another. The sensor terminals are for detecting states of the electricity storage elements. The insulating protector is made of insulating resin and holds the connecting members and the sensor terminals.

CITATION LIST

Patent Literature

Patent Literature 1: Japanese Unexamined Patent Publication No. 2013-33707

The insulating protector of the wiring module disclosed in patent literature 1 includes a holding portion and a covering portion. The holding portion holds and retains the connecting members and the sensor terminals therein. The covering portion continues from the holding portion via hinges and covers the holding portion for insulating and protecting the connecting members. The covering portion of the insulating protector closes on the hinges such that the covering portion is placed over the holding portion.

In the wiring module having such a configuration, the covering portion may be disposed at a position at which the covering portion may become an obstacle to connecting work for connecting the electricity storage elements to an external device. This may reduce the working efficiency. Furthermore, the covering portion may not be needed after the connecting work is completed.

Therefore, there is a need in the art to provide a wiring module with high workability in connecting work.

SUMMARY

The technique described in the specification is directed to a wiring module that includes an insulating protector made of insulating material and mounted to an electricity storage element group including a plurality of electricity storage elements arranged therein. The insulating protector includes a main body and a lid. The main body includes a holding portion that holds at least one of an element connecting member for connecting the electricity storage elements that are adjacent to each other and an external connecting member for connecting the electricity storage element to an external device. The lid attached to the main body and configured to swing between an open position and a closed position. The holding portion is open at the open position and closed as the closed position. One of the lid and the main body includes a shaft that is detachably attached to another one of the lid and the main body. The one of the lid and the main body includes a shaft holder that receives the shaft and holds the shaft such that rotation of the shaft is allowed. One of the lid and the main body includes a restriction portion that holds the lid such that the swing of the lid is restricted between the open position and the closed position. The other one of the lid and the main body includes a restriction portion receiving portion that receives the restriction portion.

According to the technique described in the specification, a wiring module with high workability in connecting work is provided.

EMBODIMENT OF INVENTION

Embodiment 1

Embodiment 1 of the technique described in the specification will be described with reference to FIGS. 1 to 10.

Figure 1:
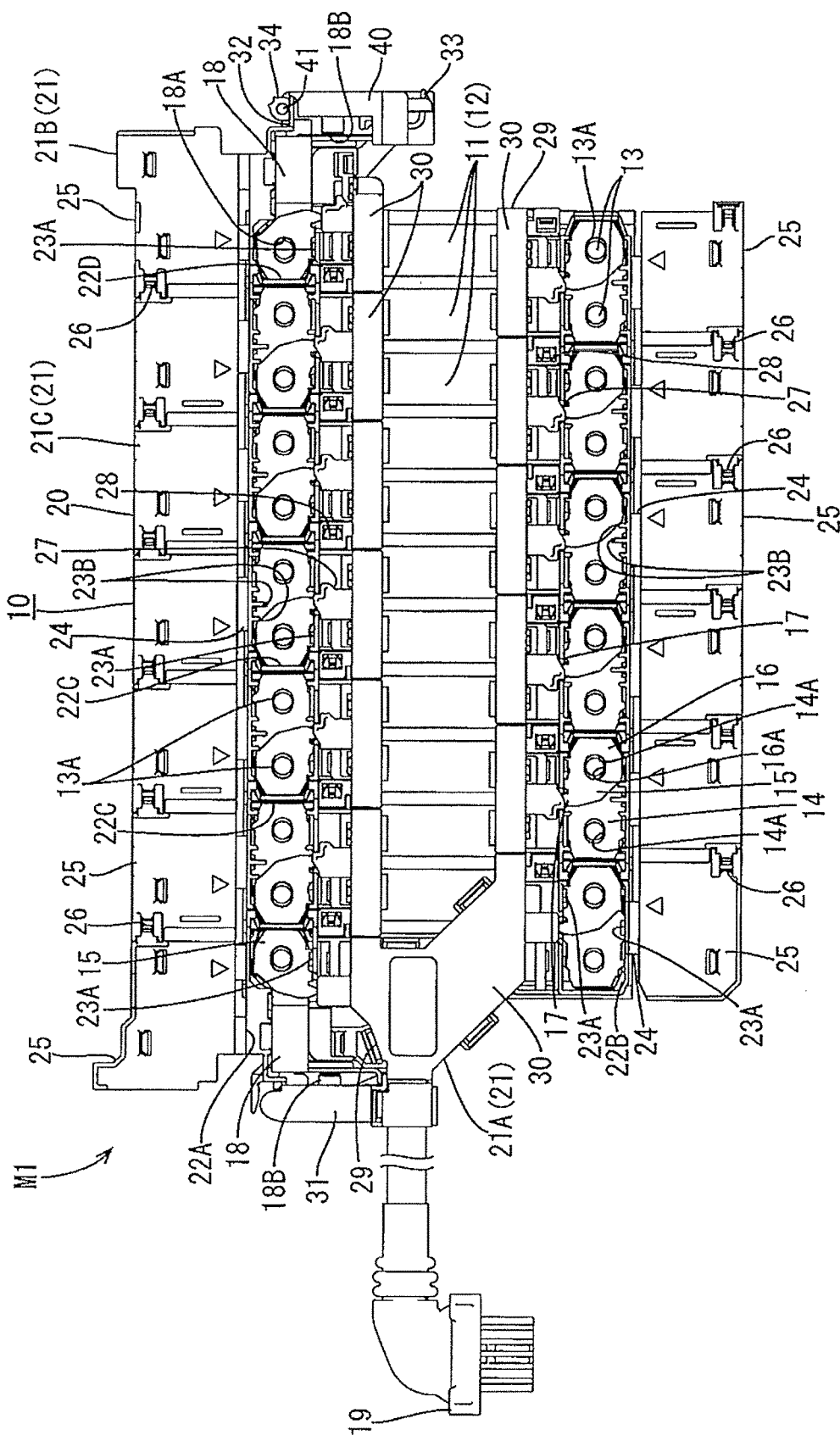
FIG. 1 is a front view of an electricity storage module that includes a wiring module according to embodiment 1 of the technique described in the specification.

A wiring module 10 illustrated in FIG. 1 is mounted to a battery module M1 (an example of an electricity storage module) installed in a vehicle such as an electric vehicle or a hybrid vehicle (not illustrated) and used as a power source for driving the vehicle.

The battery module M1 includes battery groups 12 (an example of an electricity storage element group) in which batteries 11 (an example of an electricity storage element) including electrode terminals 13 are arranged. The electrode terminals 13 are electrically connected by the wiring module 10.

In the following description, an upper side and a lower side in FIGS. 1 to 3 and 5 to 10 correspond to the top and the bottom, respectively. Furthermore, only some of components among the same components may be indicated by reference symbols and some other may not be indicated by the reference symbols.

Batteries 11

Each of the batteries 11 has a flattened rectangular parallelepiped shape. The battery 11 includes a power generating element, which is not illustrated, therein. Two electrode terminals 13 project upward from portions of an upper surface of the battery 11 closer to front and rear edges, respectively. One of the electrode terminals 13 is a positive terminal and the other is a negative terminal. The batteries 11 are arranged such that the electrode terminals 13 having different polarities are adjacent to each other. The batteries 11 are arranged in the horizontal direction in FIG. 1 and form the battery group 12.

Wiring Module 10

The wiring module 10 is mounted to the upper surface of the battery group 12. As illustrated in FIG. 1, the wiring module 10 includes an insulating protector 20 made of insulating material.

Insulating Protector 20

The insulating protector 20 includes connection unit 21 that are connected to one another. The connection unit 21 is made of insulating material. The connection unit 21 includes element connecting members 14, external connecting members 18, and voltage detecting terminals 15. Each of the element connecting members 14 establishes connection between the electrode terminals 13 of the adjacent batteries 11. The external connecting members 18 connect the electrode terminals 13 of the batteries 11 at ends to an external device. The voltage detecting terminals 15 are connected to the electrode terminals 13 for detecting voltages of the batteries 11.

The element connecting members 14 and the external connecting members 18 are prepared by pressing metal sheets made of material including copper, copper alloy, and SUS into predefined forms. The element connecting members 14 and the external connecting members 18 include terminal through holes 14A and 18A, respectively. Electrode post of the electrode terminals 13 are passed through the terminal through holes 14A and 18A. Each of the terminal through holes 14A and 18A has an elongated shape that extends in an arrangement direction of the batteries 11 (the horizontal direction in FIG. 1). Each element connecting member 14 includes two terminal through holes 14A and each external connecting member 18 includes one terminal through hole 18A.

The external connecting members 18 include the terminal through holes 18A and connecting terminals 18B each having a bolt-like shape formed so as to project and connected to another device.

The voltage detecting terminals 15 are prepared by pressing metal sheets made of material including copper, copper alloy, and SUS into a predefined form. Each of the voltage detecting terminals 15 includes an electrode connecting portion 16 having a plate-like shape and a barrel portion 17 that extends from the electrode connecting portion 16 at an offset position.

The electrode connecting portions 16 include terminal through holes 16A, respectively. The electrode posts 13A of the electrode terminals 13 are passed through the through holes 16A, respectively. Each of the voltage detecting terminals 15 is sandwiched between a nut (not illustrated) and the element connecting member 14 or a nut and the external connecting member 18 at one of the adjacent electrode terminals 13. As a result, the voltage detecting terminals 15 are electrically connected to the electrode terminals 13.

One of ends of each voltage detecting line (not illustrated) is press-fitted to the barrel portion 17 of the corresponding voltage detecting terminal 15. The other end of the voltage detecting line is connected to a connector 19 (see FIG. 1) which is connected to an external device (not illustrated) such as an ECU.

Each of the connection units 21 includes a connection unit at a left end in FIG. 1 (may be referred to as "a first end unit 21A"), a connection unit at an upper right end in FIG. 1 (may be referred to as a second end unit 21B), and a third connection unit 21C that is different from the connection units.

In each of the connection units 21, the nut is screwed to the electrode post 13A that is in the terminal through hole 14A of the element connecting member 14 or the terminal through hole 18A of the external connecting member 18. The element connecting member 14 or the external connecting member 18 is sandwiched between the nut and a terminal mount (not illustrated). As a result, the electrode terminals 13 and the element connecting members 14 are electrically connected and the electrode terminals 13 and the external connecting member 18 are electrically connected.

The connection units 21 are connected to one another with connecting portions 28 beside barrel holding portions 27 and lid connecting portions 26 of a connected lid 25.

As illustrated in FIG. 1, the first end unit 21A is arranged in the vertical direction at the left end of the battery group 12. The first end unit 21A includes a first holding portion 22A, a second holding portion 22B, the connected lid 25, the barrel holding portions 27, wire holding portions 29, wire cover portions 30, and a terminal cover portion 31. The first holding portion 22A holds and retains the outer connecting member 18 and the voltage detecting terminal 15. The second holding portion 22B holds and retains the element connecting member 14 and the voltage detecting terminals 15. The connected lid 25 closes the first holding portion 22A and the second holding portion 22B. The barrel holding portions 27 hold the barrel portions 17 of the voltage detecting terminals 15 which extends out of the first holding portion 22A and the second holding portion 22B, respectively. The wire holding portions 29 hold and retain the voltage detecting lines. The wire cover portions 30 cover the wire holding portions 29. The terminal cover portion 31 covers the connecting terminal 18B of the external connecting member 18.

The connected lid 25 and the first holding portion 22A are connected with the hinge 24 and the connected lid 25 and the second holding portion 22B are connected with the hinge 24. The first holding portion 22A, the barrel holding portion 27, the wire holding portions 29, the barrel holding portion 27, and the second holding portion 22B are arranged in this sequence in the top-bottom direction (see FIG. 1).

As illustrated in FIG. 1, the first holding portion 22A and the second holding portion 22B include locks 23A, respectively. The locks 23A are for locking the element connecting member 14 and the voltage detecting terminal 15 while they overlap each other and the external connecting member 18 and the voltage detecting terminal 15 while they overlap each other.

At the end of the wire holding portion 29 of the first terminal unit 21 (at the left end in FIG. 1), the connector 19 for connection with the external device (e.g., an ECU) is disposed.

Each of the third connection units 21C includes a third holding portion 22C, the connected lid 25, the barrel holding portion 27, the wire holding portion 29, and the wire cover portion 30. The third holding portion 22C holds and retains the element connecting member 14 and the voltage detecting terminal 15. The connected lid 25 closes the third holding portion 22C. The barrel holding portion 27 holds the barrel portion 17 of the voltage detecting terminal 15 which extends out of the third holding portion 22C. The wire holding portion 29 holds and retains the voltage detecting line. The wire cover portion 30 covers the wire holding portion 29.

As illustrated in FIG. 1, the third holding portion 22C includes a lock 23A for locking the element connecting member 14 and the voltage detecting terminal 15 while they overlap each other. The third holding portion 22C further includes a holding protrusions 23B each protruding inward to inhibit ejection of the element connecting member 14 and the voltage detecting terminal 15 upward.

Figure 2:
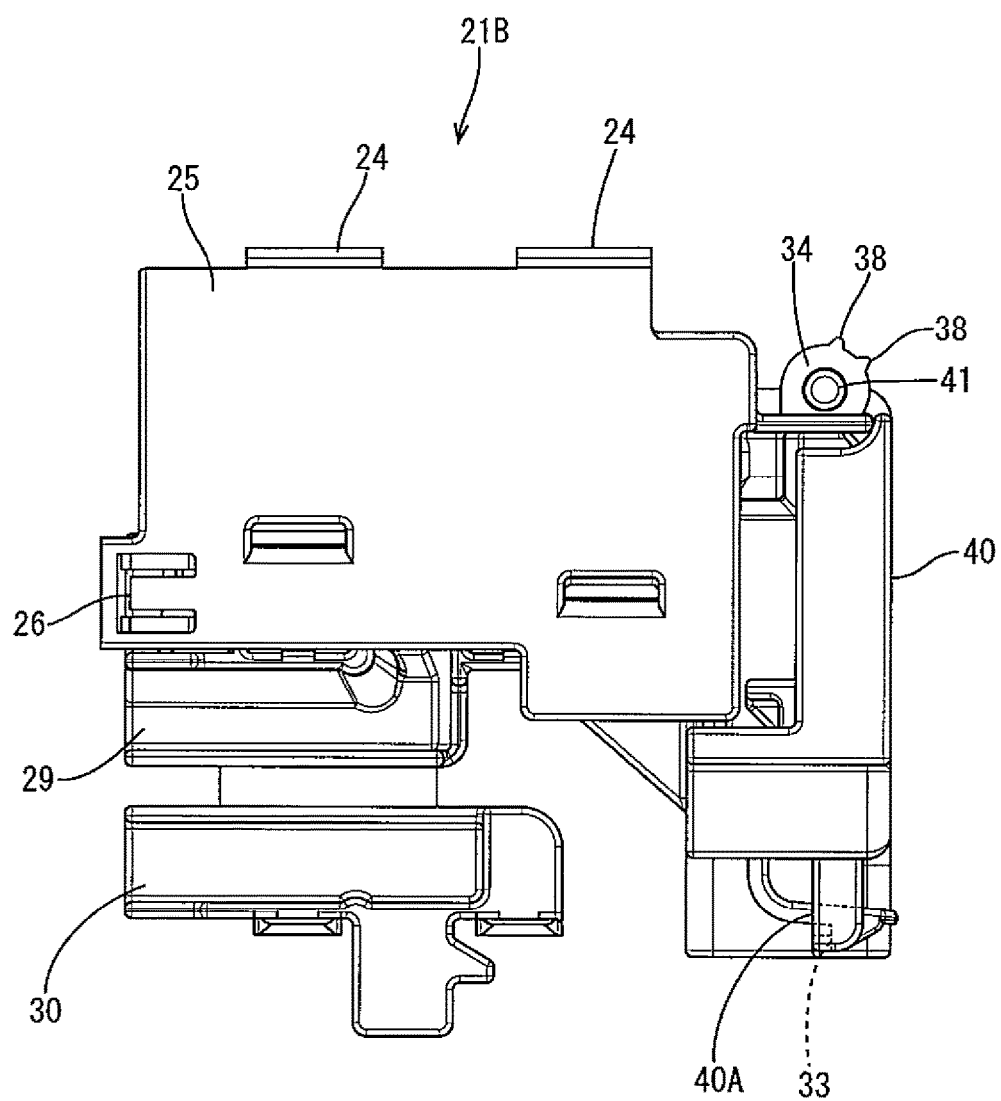
FIG. 2 is a front view of a second end unit (a connection unit)
Figure 3:
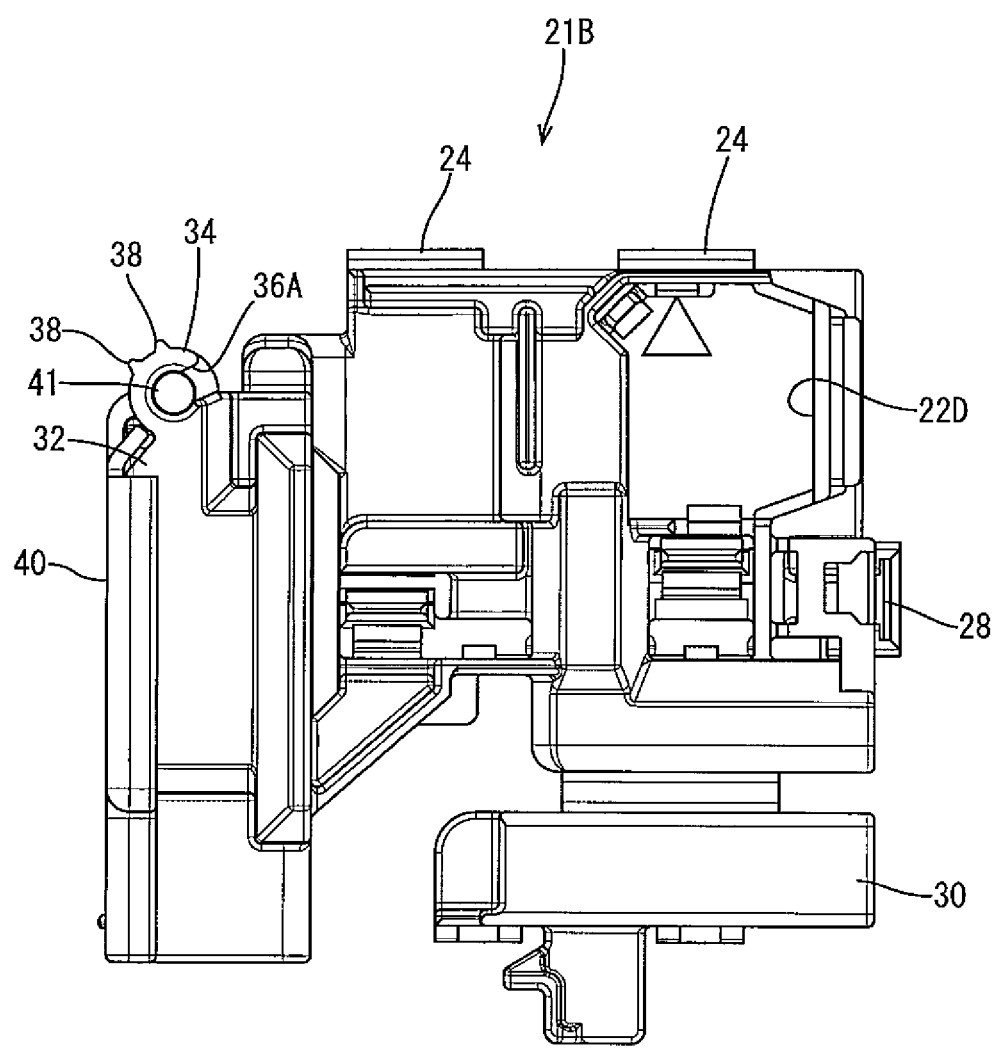
FIG. 3 is a rear view of the second end unit.
Figure 4:
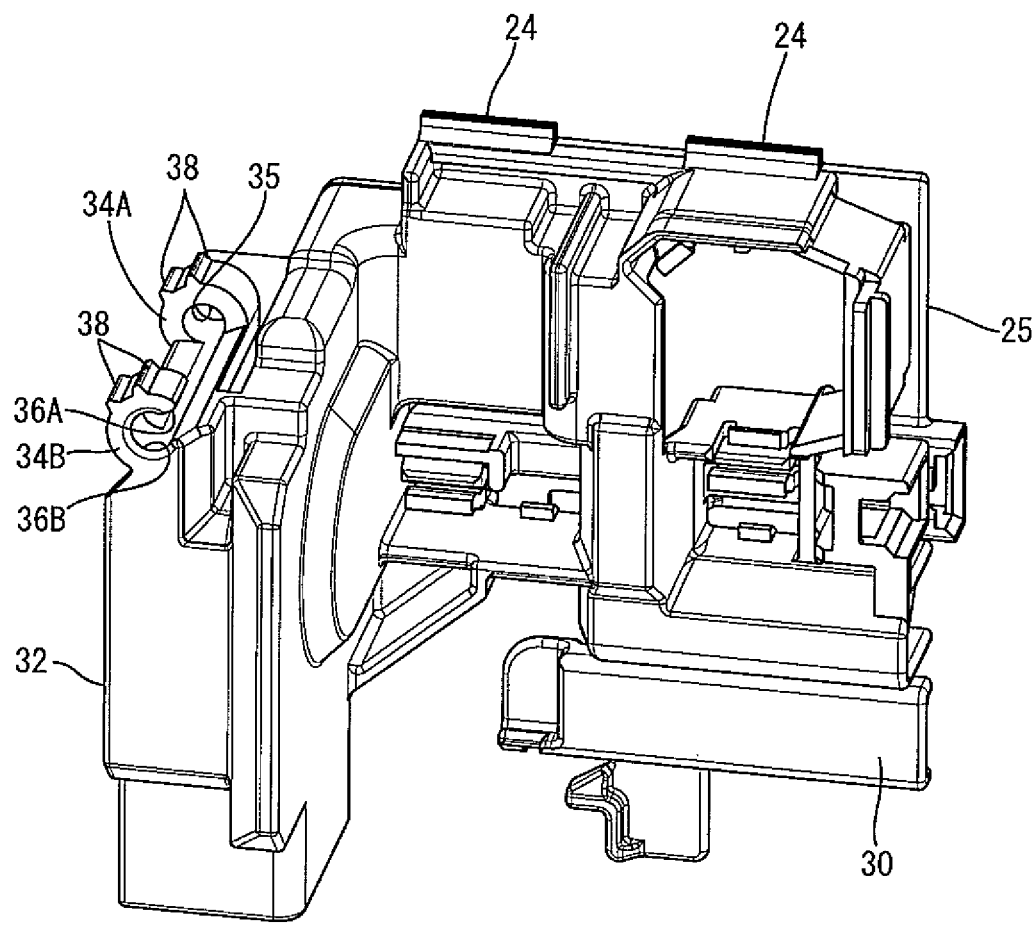
FIG. 4 is a perspective rear view of the second end unit without a lid.
Figure 7:
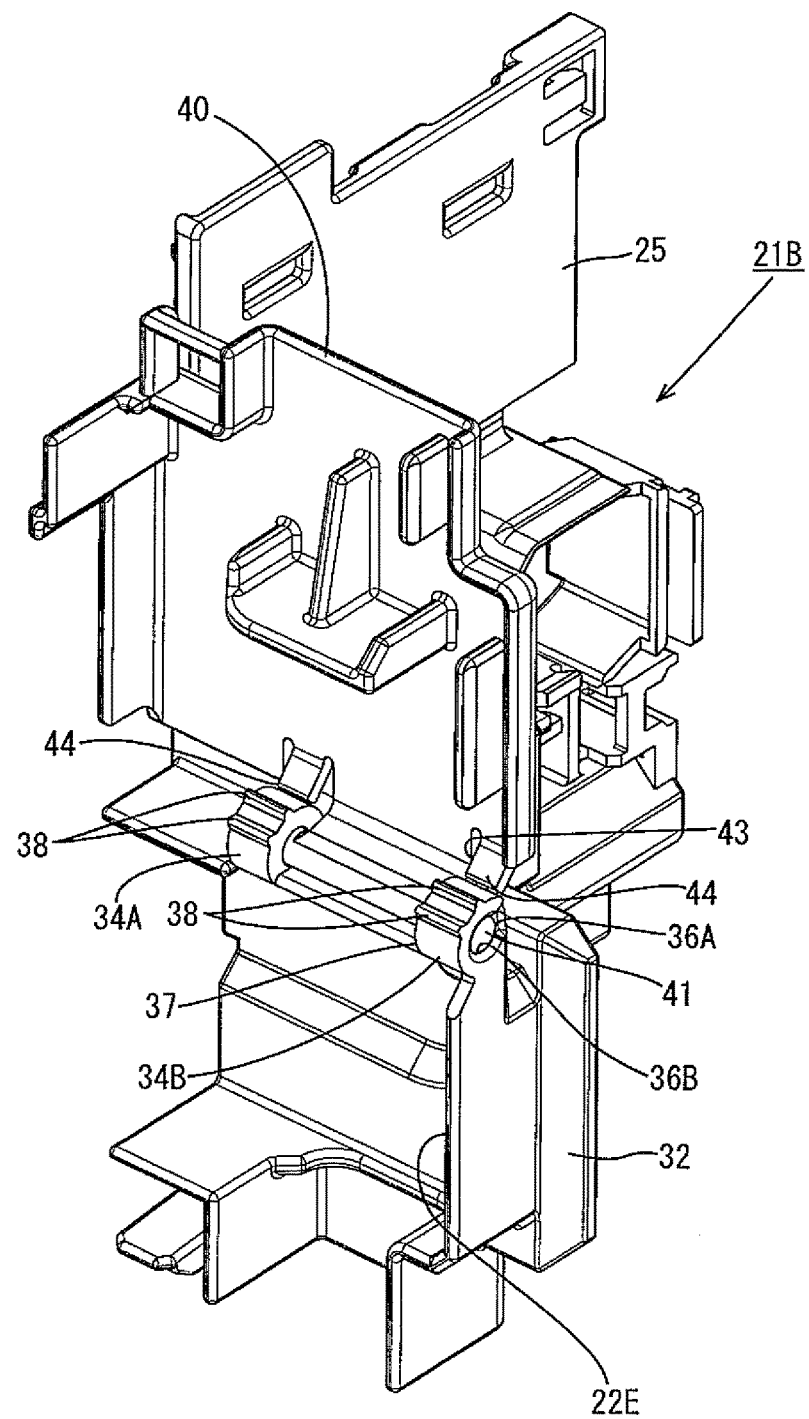
FIG. 7 is a perspective view of the second end unit with the lid.

The second end unit 21B includes a fourth holding portion 22D, a main body 32, and a flap lid 40 (an example of a lid). The fourth holding portion 22D holds and retains the external connecting member 18 and the voltage detecting terminal 15. The main body 32 includes a fifth holding portion 22E that holds and retains the connecting terminal 18B of the external connecting member 18. The flap lid 40 is mounted to the main body 32 and configured to swing between an open position and a closed position. The flap lid 40 opens the fifth holding portion 22E at the open position. The flap lid 40 covers and closes the firth holding portion 22E at the closed position. At the opening position at which the fifth holding portion 22E is open, the inside of the fifth holding portion 22E is exposed as illustrated in FIG. 7. At the closed position at which the fifth holding portion 22E is covered and closed, the fifth holding portion 22E is covered with the flap lid 40 as illustrated in FIGS. 1 to 3.

The main portion of the second end unit 21B further includes the connected lid 25, the barrel holding portion 27, the wire holding portion 29, and the wire cover portion 30. The connected lid 25 covers the fourth holding portion 22D and is connected to the connected lid 25 of the adjacent third connecting unit 21C. The barrel holding portion 27 holds the barrel portion 17 of the voltage detecting terminal 15 that extends out of the fourth holding portion 22D. The wire holding portion 29 holds and retains the voltage detecting line. The wire cover portion 30 covers the wire holding portion 29.

The connected lid 25 and the fourth holding portion 22D are connected together with the hinge 24. The fourth holding portion 22D, the barrel holding portion 27, the wire holding portion 29, and the wire cover portion 30 are arranged in the top-bottom direction (see FIG. 1). As illustrated in FIG. 2, the connected lid 25 covers the fourth holding portion 22D and the barrel holding portion 27 when the hinge 24 is closed.

The fourth holding portion 22D includes the lock 23A that locks the external connecting member 18 and the voltage detecting terminal 15 while they overlap each other.

The fifth holding portion 22E continues from the fourth holding portion 22D in a substantially vertical direction in a form capable for holding the connecting terminals 18B of the external connecting member 18. A locking pawl 33 is provided in an area adjacent to the fifth holding portion 22E for locking the flap lid 40 when the flap lid 40 is at the closed position at which the flap lid 40 covers and closes the fifth holding portion 22E (see FIG. 2).

Figure 5:
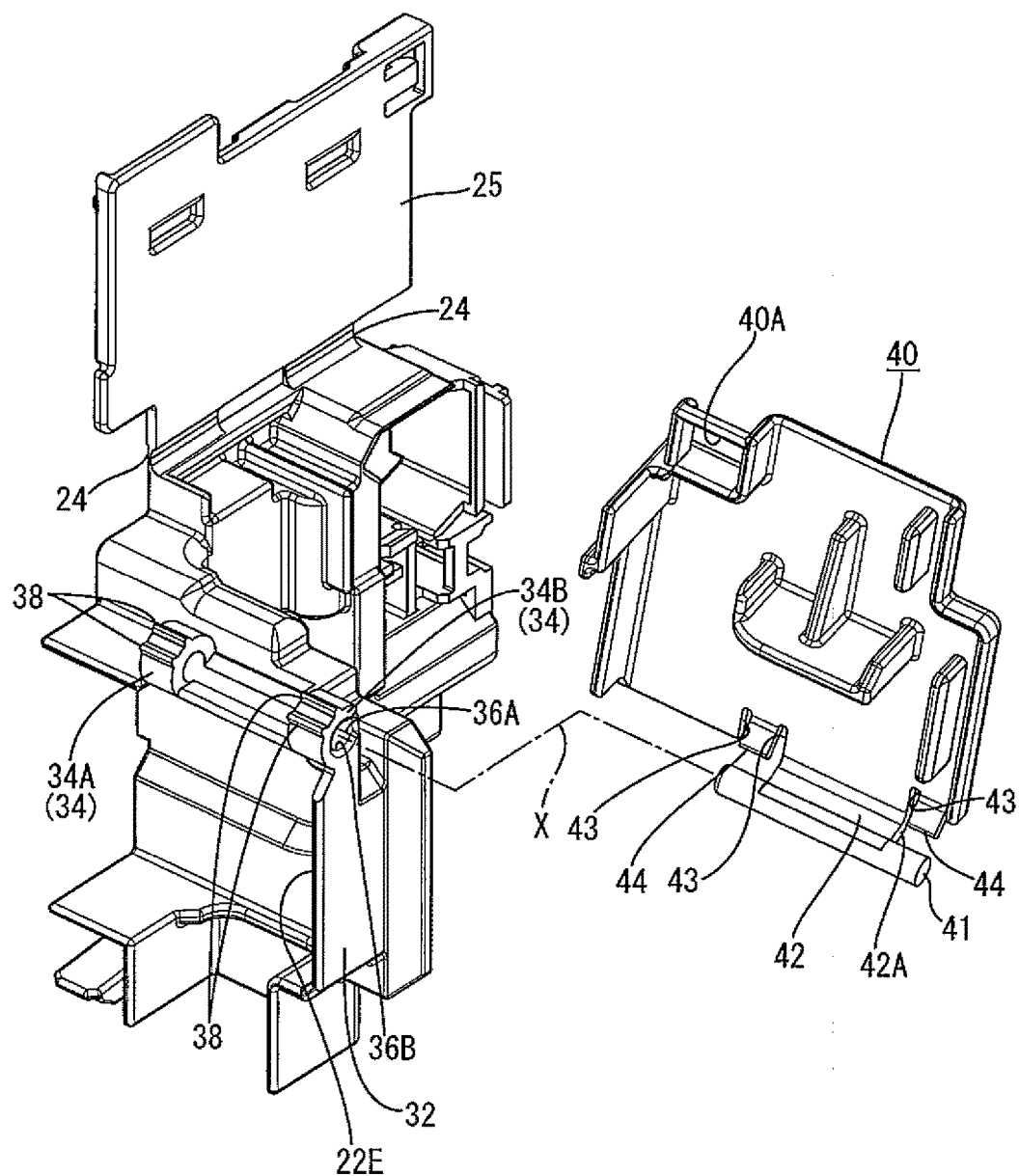
FIG. 5 is a perspective view of the second end unit with a mounting position of the lid indicated.
Figure 6:
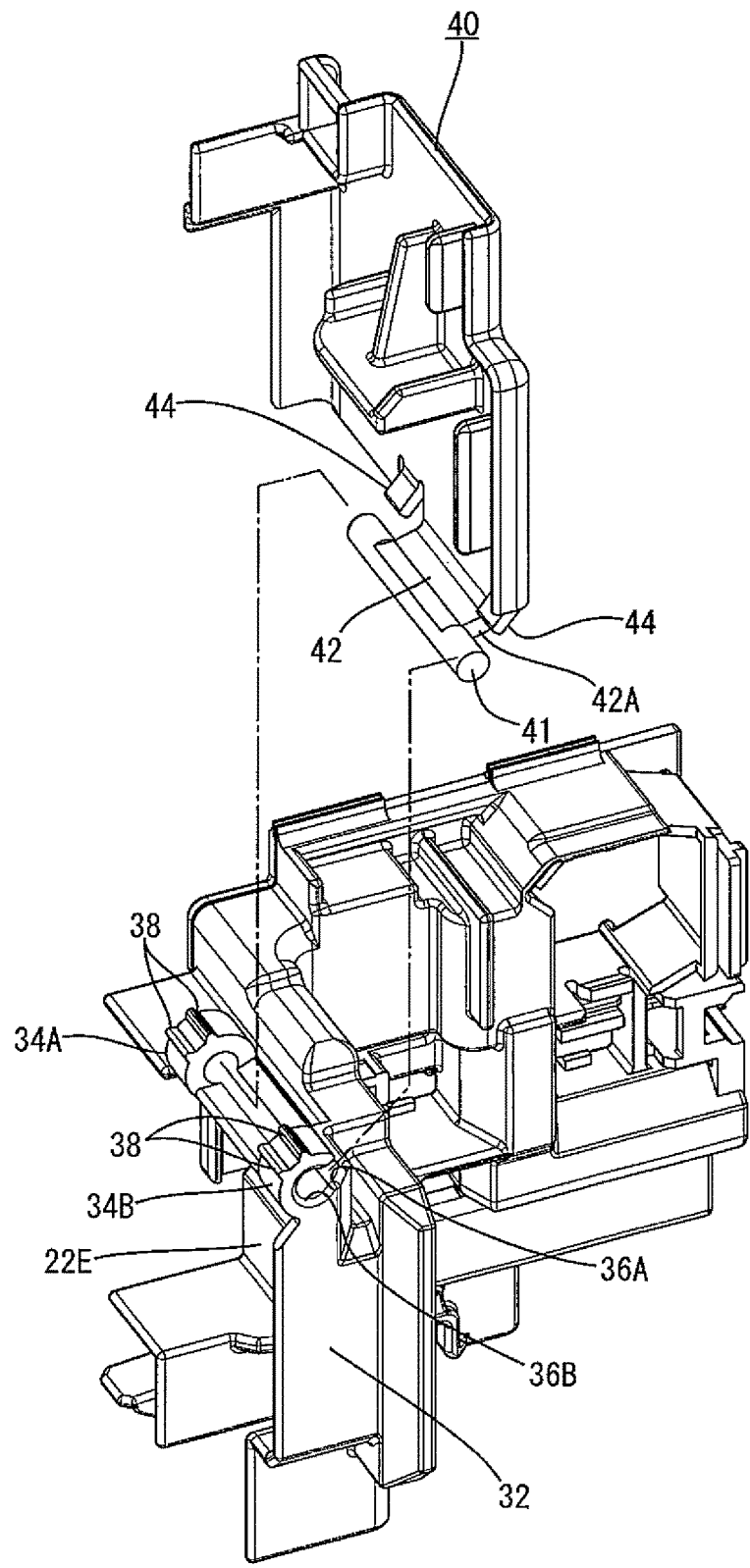
FIG. 6 is a perspective view of the second end unit with the mounting position of the lid from a different angle from FIG. 5.

As illustrated in FIGS. 5 and 6, the flap lid 40 includes a shaft 41 that is detachably attached to the main body 32. The main body 32 includes a shaft holder 34 at an edge of the fifth holding portion 22E for receiving the shaft 41 and holding the shaft 41 such that rotation of the shaft 41 is allowed.

As illustrated in FIG. 5, the shaft of the flap lid 40 is located at an extending portion 42 that extends from an edge of the flap lid 40.

The shaft holder 34 of the main body 32 includes a first shaft holding portion 34A and a second shaft holding portion 34B. The first shaft holding portion 34A includes a round recess 35 (an example of a receiving portion) having a diameter that is sufficient for fitting the shaft 41 therein. The second shaft holding portion 34B having a C shape in a rear view includes a through hole 36B (an example of a receiving portion) with a diameter smaller than the diameter of the shaft 41. The second shaft holding portion 34B includes a slit 36A that extends in the longitudinal direction of the second shaft holding portion 34B.

A width of the slit 36A is defined larger than a thickness of the extending portion 42 of the flap lid 40 when the shaft 41 is not inserted. When the shaft 41 is inserted into the through hole 36B of the second shaft holding portion 34B and then into the round recess 35 of the first shaft holding portion 34A, the shaft 41 is held.

When the shaft 41 is rotated after the shaft 41 is held by the shaft holder 34, an end surface of the extending portion 42 of the flap lid 40 is brought into contact with an inner end surface 37 of the second shaft holding portion 34B and the shaft 41 is set in a retained condition. Namely, the inner end surface 37 of the second shaft holding portion 34B functions as a retainer that inhibits removal of the shaft 41 when the inner end surface 37 is in contact with a member that includes the shaft 41 (i.e., the extending portion 42 of the flap lid 40).

The shaft holder (or the main body 32) includes restriction protrusions 38 (an example of a restriction portion) for holding the flap lid 40 in a condition that the swinging thereof relative to the main body 32 between the open position at which the fifth holding portion 22E is open and the closed position at which the fifth holding portion 22E is covered and closed is inhibited. The flap lid 40 includes locking pawls 44 (an example of a restriction portion receiving portion) for receiving the restriction protrusions 38.

Specifically, each of the first shaft holding portion 34A and the second shaft holding portion 34B includes two of the restriction protrusions 38 (an example of a restriction portion) separated from each other in the direction of rotation of the shaft 41. Each of the restriction protrusions 38 extends in a direction that crosses the direction of rotation of the shaft 41 and protrudes outward.

The flap lid 40 includes slits 43 on sides of the extending portion 42. The locking pawls 44 (an example of a restriction portion receiving portion) are formed on sides of the slits 43. Each of the locking pawls 44 is inserted between the restriction protrusions 38 and locked.

Assembly and Mounting of the Wiring Module

Next, an example of assembly of the wiring module 10 and an example of mounting thereof to the battery group 12 will be described. First, the connection units 21 are prepared and connected to one another with the connecting portions 28 that are beside the barrel portions 27 of the respective connection units 21 and the lid connecting portions 26 of the respective connected lids 25.

Next, the component connecting members 14 are placed in the third holding portions 22C of the third connection units 21, respectively and the external connecting members 18 are placed in the first holding portion 22A of the first end unit 21A and the fourth holding portion 22D and the fifth holding portion 22E of the second end unit 21B, respectively. Then, the voltage detecting lines connected to the respective voltage detecting terminals 15 are routed in the wire holding portions 29 and the voltage detecting terminals 15 are arranged inside the first holding portion 22A, the second holding portions 22B, the third holding portions 22C, and the fourth holding portion 22D, respectively.

Figure 8:
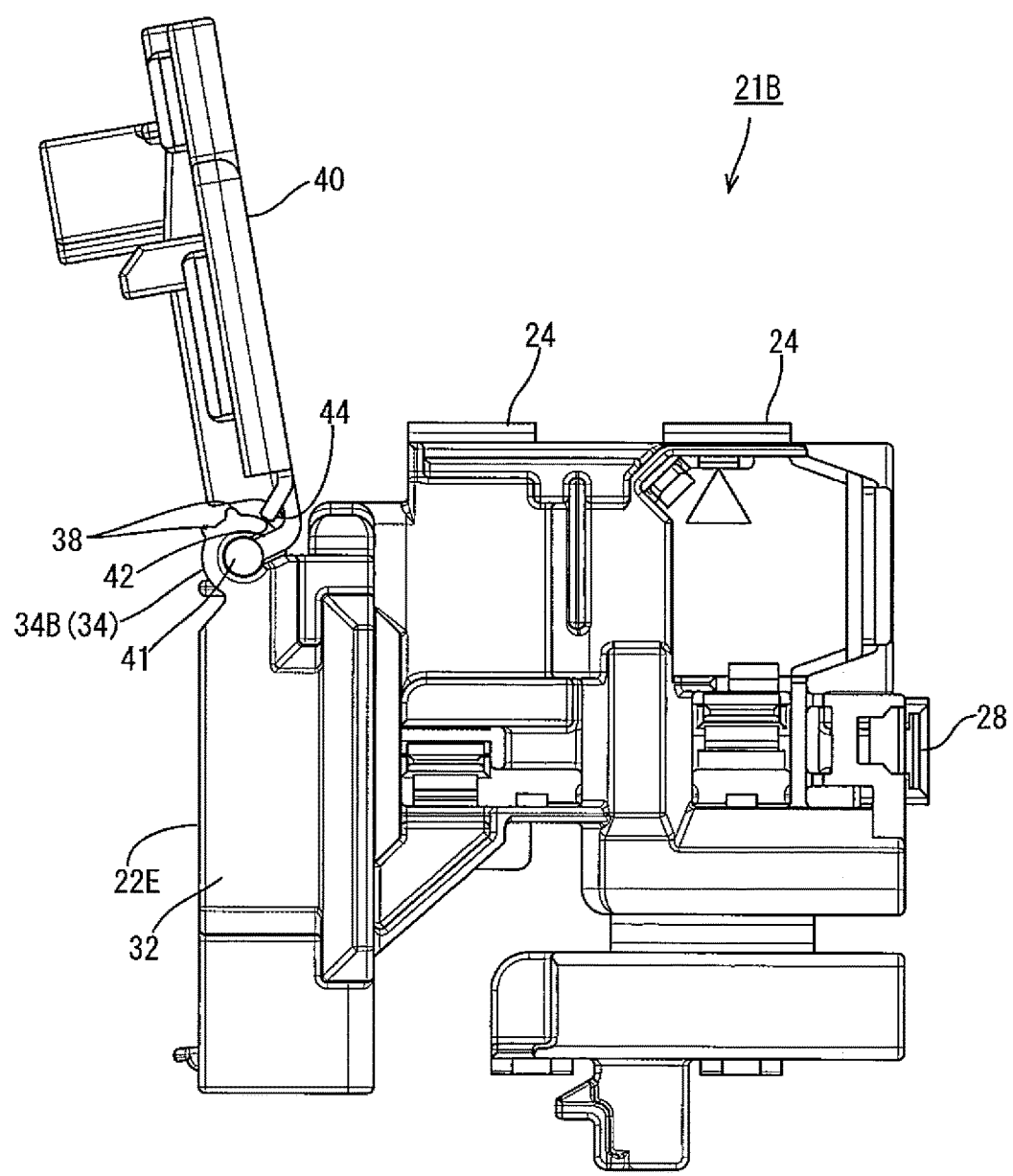
FIG. 8 is a rear view of the second end unit in FIG. 7.
Figure 9:
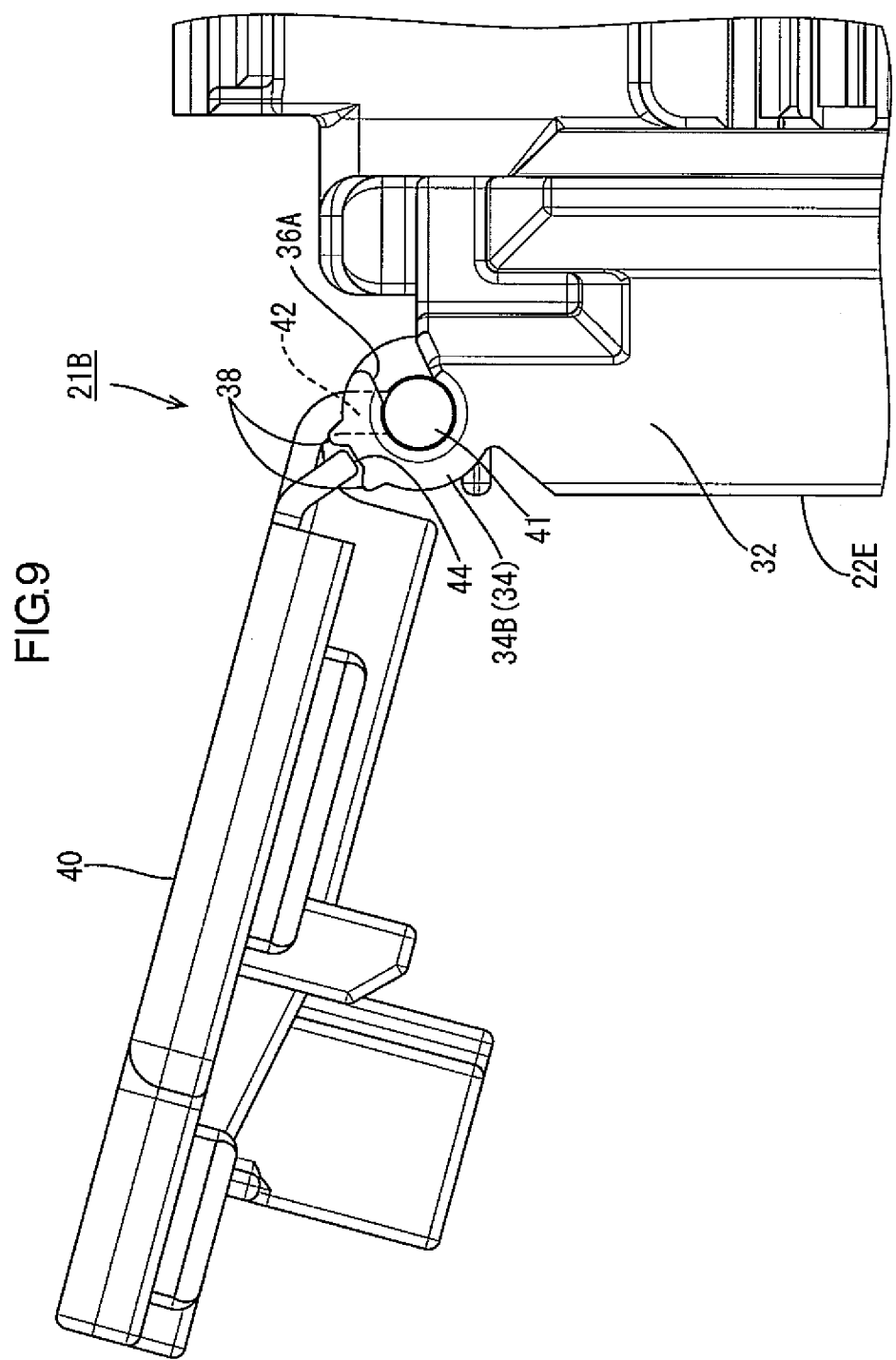
FIG. 9 is a magnified view of a relative portion of the second end unit with the lid, swing of which is restricted.

Next, the flap lid 40 is mounted to the second end unit 21. As indicated with dotted line X in FIG. 5, the shaft 41 of the flap lid 40 is inserted into the through hole 36B of the second shaft holding portion 34B and then into the round recess 35 of the first shaft holding portion 34A. As illustrated in FIGS. 7 and 8, the shaft 41 of the flap lid 40 is received by the shaft holding portions 34A and 34B. When the shaft 41 is held at a position at which the shaft 41 is inserted in the through hole 36B of the second shaft holding portion 34B and the round recess 35 of the first shaft holding portion 34A (i.e., at a position at which the shaft 41 is received), the inner end surface 37 of the second shaft holding portion 34B is not in contact with an end surface 42A of the extending portion 42 of the flap lid 40 (a member that includes the shaft 41). At the position at which the shaft 41 is received, the fifth holding portion 22E is open (at the open position).

When the shaft 41 is rotated in a counterclockwise direction in FIG. 8, the inner end surface 37 of the second shaft holding portion 34B is brought into contact with the end surface 42A of the extending portion 42 of the flap lid 40. As a result, the removal of the shaft 41 is inhibited (see FIG. 9). When the shaft 41 (of the flap lid 40) is rotated in the counterclockwise direction in FIG. 8 and the locking pawls 44 of the shaft 41 are brought into contact with the first restriction protrusions 38 of the shaft holder 34, the locking pawls 44 elastically deform. When each locking pawl 44 is received between the restriction protrusions 38 of the shaft holder 34, the locking pawl 44 restores its shape and the swing of the flap lid 40 is restricted (see FIG. 9).

Figure 10:
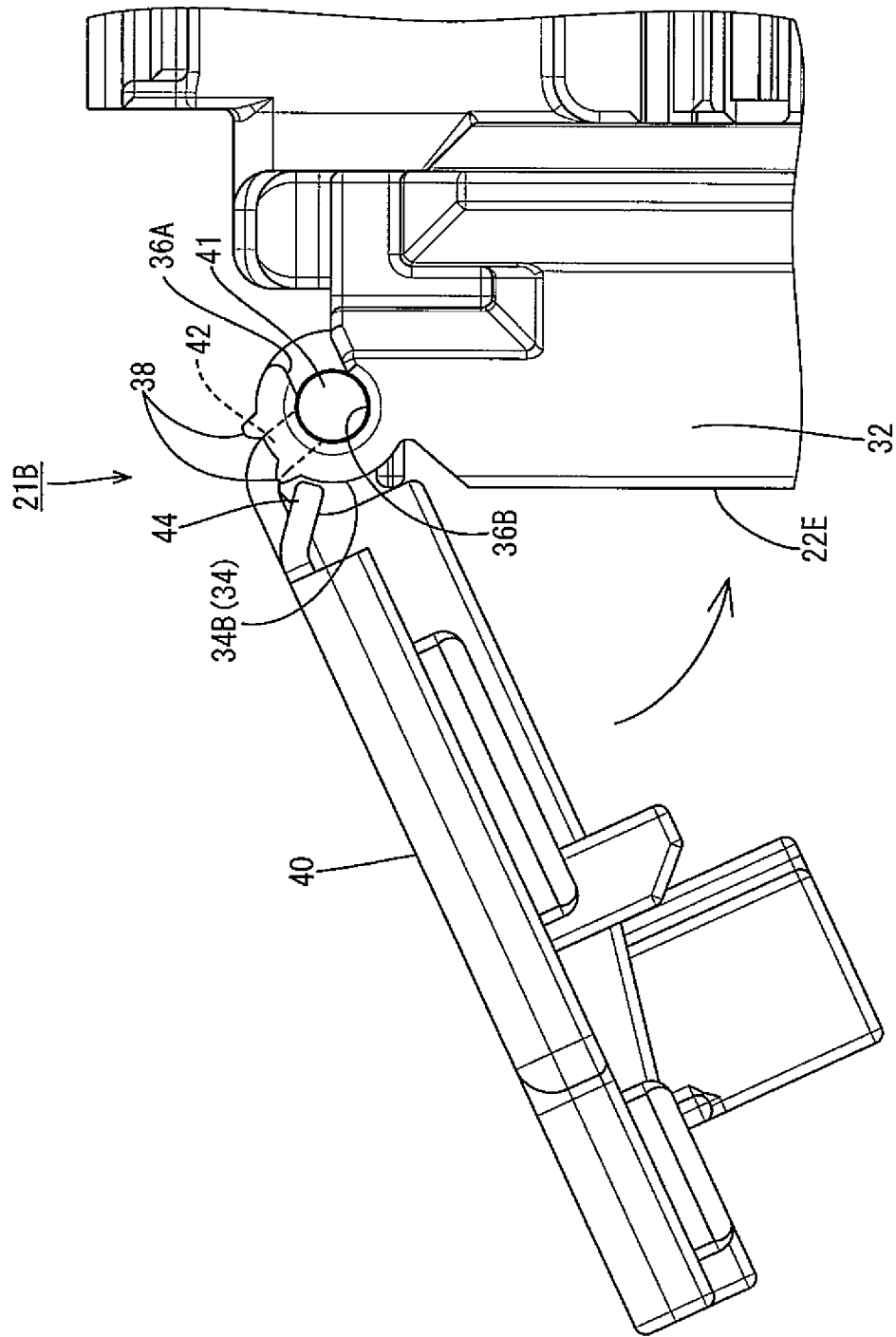
FIG. 10 is a magnified view of a relative portion of the second end unit with the lid, swing of which from a restricted position to a closed position is indicated.

When the flap lid 40 is further swung in a direction indicated in FIG. 10, the flap lid 40 may be set to a state to cover and close the fifth holding portion 22E. When the locking pawl 33 that is located in the area adjacent to the fifth holding portion 22E is fitted in a locking hole 40A of the flap lid 40, the flap lid 40 is locked to the main body 32.

Twelve of the batteries 11 are arranged in the horizontal direction in FIG. 1 with the surfaces on which the electrode terminals 13 facing upward. The wiring module 10 that is in a state illustrated in FIG. 1 (i.e., the flap lid 40 is locked) is mounted. The electrode terminals 13 are placed in the terminal through holes 14A of the component connecting members 14, the terminal through holes 18A of the external connecting members 18, and the terminal through holes 16A of the voltage detecting terminals 15. Then, the nuts are screwed to the electrode terminals 13, respectively. As a result, the batteries 11 are connected in series. Next, the hinges 24 are closed and the connected lids 25 are placed so as to cover the holding portions and locked. This completes the battery module M1.

Connecting to an External Device

Connecting of the battery module M1 to an external device is performed. The flap lid 40 is released from a locked state and swung from the closed position to the open position. When the locking pawls 44 of the flap lid 40 are in contact with the restriction protrusions 38, the locking pawls 44 elastically deform. When each of the locking pawls 44 is received between the restriction protrusions 38, the locking pawl 44 restores its shape and is received between the restriction protrusions 38. As a result, the swing of the flap lid is restricted (see FIG. 9).

If the flap lid 40 is disposed so as to face upward as illustrated in FIG. 8, the flap lid 40 may move downward due to the gravity and thus become an obstacle to the connecting work. In this embodiment, the swing of the flap lid 40 is restricted at a position illustrated in FIG. 9. Therefore, the flap lid 40 does not become an obstacle to the connecting work and thus the connecting of the external connecting members 18 to the external device is smoothly performed. A known method may be used for the connecting of the external connecting members 18 to the external device.

After the connecting of the external connecting members 18 to the external device is completed and the flap lid 40 is needed, the flap lid 40 may be swung in the direction illustrated in FIG. 10 to the closed position and locked to the main body 32.

If the flap lid 40 is not needed after the connecting of the external connecting members 18 to the external device, the flap lid 40 may be swung in the direction opposite to the direction indicated in FIG. 10 to the position at which the shaft 41 is received. The end surface 37 of the second shaft holding portion 34B is not in contact with the member that includes the shaft 41 (i.e., the end surface 42A of the extending portion), that is, the shaft 41 is released from the retained condition. Because the shaft 41 is released from the retained condition, that is, from the shaft holder 34, the shaft 41 is pulled out of the shaft holder 34 and the flap lid 40 is easily removed from the main body 32.

Functions and Effects of the Embodiment

In this embodiment, the flap lid 40 includes the shaft 41 that is detachably attached to the main body 32 and the main body 32 includes the shaft holder 34 that receives the shaft 41 and holds the shaft 41 such that the shaft 41 is rotatable. By attaching the shaft 41 of the flap lid 40 to the shaft holder 34 of the main body 32, the flap lid 40 is attached to the main body 32 with the swing of the flap lid 40 allowed. Furthermore, by detaching the shaft 41 from the shaft holder 34, the flap lid 40 is detached from the main body 32. According to this embodiment, the flap lid 40 is easily removed if the flap lid 40 is no longer needed.

In this embodiment, the main body 32 includes the restriction protrusions 38 (a restriction portion) for holding the flap lid 40 while the swinging thereof is restricted between the open position and the closed position. The flap lid 40 includes the locking pawls 44 (a restriction portion receiving portion) for receiving the restriction protrusions 38. According to the configuration, the flap lid 40 is held while the swinging thereof is restricted between the open position and the closed position. According to this embodiment, the connecting work is performed while the swing of the flap lid 40 is restricted to a position range between the open position and the closed position in which the flap lid 40 does not become an obstacle to the connecting work. The wiring module 10 having high operability for the connecting work is provided.

At least two of the restriction protrusions 38 arranged with intervals in the rotation direction of the shaft 41 in this embodiment correspond to the restriction portion. The locking pawls 44 included in the flap lid 40 (a member that includes the shaft 41) and each locked between the adjacent restriction protrusions 38 correspond to the restriction portion receiving portion. The swing of the flap lid 40 is restricted with a simple structure.

In this embodiment, the shaft holder 34 includes the round recess 35 and the through hole 36B for receiving the shaft 41 (a receiving portion) and the retainer (the inner end surface 37 of the second shaft holding portion 34B). The retainer is not in contact with the flap lid 40 that includes the shaft 41 at the position at which the shaft 41 is received but in contact with the flap lid 40 that includes the shaft 41 at the position at which the shaft 41 is set in the retained condition with respect to the shaft holder 34. The shaft 41 is set in the retained condition with respect to the shaft holder 34 by rotating the shaft 41 to the position at which the shaft 41 is retained after the shaft 41 is placed in a receiving portion of the shaft holder 34 in the mounting of the flap lid 40 to the main body 32. According to this embodiment, the flap lid 40 is set in the retained condition with respect to the main body 32. Therefore, the removal of the flap lid 40 is less likely to occur.

Other Embodiments

The technique described in the specification is not limited to the above described and illustrated embodiment. For example, the following embodiments are also included in the technical scope of technique described in the specification.

(1) In the above embodiment, the flap lid 40 (a lid) includes the shaft 41 and the main body 32 includes the shaft 41. However, the main body 32 may include the shaft holder and the lid may include the shaft.

(2) In the above embodiment, the shaft holder 34 of the main body 32 includes the restriction protrusions 38 and the flap lid 40 that includes the shaft 41 includes locking pawls 44. However, the restriction protrusions may be provided separately from the main body or the shaft holder.

(3) In the above embodiment, the shaft holder 34 includes two or more restriction protrusions 38 and the locking pawls 44 are the restriction portion receiving portions that are included in the member that includes the shaft 41. The restriction portion may include two or more restriction protrusions included in a member that includes the shaft and the restriction portion receiving portions may be locking pawls included in the shaft holder.

(4) The above embodiment includes the shaft holding portion 34B including the inner end surface 37 (retainer) that inhibits removal of the shaft 41. The retainer 37 is not in contact with the flap lid 40 that includes the shaft 41 at the position at which the shaft is received but in contact with the flap lid 40 that includes the shaft 41 at the position at which the removal of the shaft 41 from the shaft holder 34 is restricted. However, the shaft holder may not include the retainer.

(5) In the above embodiment, the electricity storage elements are the batteries 11. However, the electricity storage elements may be capacitors.

List of Reference Signs

10 . . . Wiring module
11 . . . Battery (Electricity storage element)
12 . . . Battery group (Electricity storage element group)
14 . . . Element connecting member
14A . . . Terminal through hole
18 . . . External connecting member
18A . . . Terminal through hole
18B . . . Connecting terminal
20 . . . Insulating protector
21 . . . Connection unit
21A . . . First end connection unit
21B . . . Second end connection unit
21C . . . Third connection unit
22D . . . Fourth holding portion
22E . . . Fifth holding portion
32 . . . Main body
34 . . . Shaft holder
34A . . . First shaft holding portion
34B . . . Second shaft holding portion
35 . . . Round recess (Receiving portion)
36A . . . Slit
36B . . . Through hole (Receiving portion)
37 . . . Inner end surface (of shaft holder) (Retainer)
38 . . . Restriction protrusion (Restriction portion)
40 . . . Flap lid (Lid, Member that includes the shaft)
41 . . . Shaft
42 . . . Extending portion
42A . . . End surface of extending portion
44 . . . Locking pawl (Restriction portion receiving portion)
M1 . . . Battery module (Electricity storage module)

Technique Described in the Specification

The technique described in the specification is directed to a wiring module that includes an insulating protector made of insulating material and mounted to an electricity storage element group including a plurality of electricity storage elements arranged therein. The insulating protector includes a main body and a lid. The main body includes a holding portion that holds at least one of an element connecting member for connecting the electricity storage elements that are adjacent to each other and an external connecting member for connecting the electricity storage element to an external device. The lid attached to the main body and configured to swing between an open position and a closed position. The holding portion is open at the open position and closed as the closed position. One of the lid and the main body includes a shaft that is detachably attached to another one of the lid and the main body. The one of the lid and the main body includes a shaft holder that receives the shaft and holds the shaft such that rotation of the shaft is allowed. One of the lid and the main body includes a restriction portion that holds the lid such that the swing of the lid is restricted between the open position and the closed position. The other one of the lid and the main body includes a restriction portion receiving portion that receives the restriction portion.

According to the technique described in the specification, one of the lid and the main body includes the shaft that is detachably attached to the other one of the lid and the main body. The other one of the lid and the main body includes the shaft holder that receives the shaft and holds the shaft such that the rotation of the shaft is allowed. The shaft of the one of the lid and the main body is attached to the shaft holder of the other one of the lid and the main body. According to the configuration, the lid is attached to the main body such that the swing of the lid is allowed and removed from the main body by detaching the shaft from the shaft holder. According to the technique described in the specification, the lid is easily removed when the lid is no longer needed after connecting work is completed.

According to the technique described in the specification, one of the main body and the lid includes a restriction portion that holds the lid to the main body such that the swing of the lid is restricted between the open position and the closed position. The other one of the main body and the lid includes the restriction portion receiving portion that receives the restriction portion. According to the configuration, the lid is held such that the swinging thereof is restricted between the opening portion and the closed position. According to the technique described in the specification, the connecting work can be performed while the lid is held at a position between the open position and the closed position at which the lid does not become an obstacle to the connecting work. Namely, the wiring module with high workability in the connecting work is provided.

The following configurations may be included in the scope of the technique described in the specification. The restriction portion may include two or more restriction protrusions that are separated from each other in a rotation direction of the shaft on the shaft holder. The restriction portion receiving portion may include a locking pawl included in the member that includes the shaft and locked between the restriction protrusions that are adjacent to each other. According to the configuration, that is, the shaft holder includes the restriction protrusions and the member that includes the shaft includes the locking pawl, the swing of the lid is restricted with a simple configuration.

The shaft holder may include a receiving portion that receives the shaft. The shaft holder may include a retainer that is configured not to be in contact with the member that includes the shaft at a position at which the shaft is received and to be in contact with the member that includes the shaft at a position at which removal of the shaft from the shaft holder is restricted.

According to the configuration, during the mounting of the lid to the main body, the shaft is placed in the receiving portion of the shaft holder and the shaft is rotated to the position at which the removal of the shaft is restricted. As a result, the removal of the shaft from the shaft holder is restricted. According to the above configuration, the removal of the lid is restricted and thus the lid is less likely to come off.

[Effect of Invention]

The invention claimed is:

1. A wiring module comprising an insulating protector made of insulating material and mounted to an electricity storage element group including a plurality of electricity storage elements arranged therein, the insulating protector comprising:
    a main body including a holding portion holding at least one of an element connecting member for connecting the electricity storage elements that are adjacent to each other and an external connecting member for connecting the electricity storage element to an external device; and
    a lid attached to the main body and configured to swing between an open position and a closed position, the open position at which the holding portion is open, the closed position at which the holding portion is closed, wherein
    one of the lid and the main body includes a shaft that is detachably attached to another one of the lid and the main body,
    the one of the lid and the main body includes a shaft holder that receives the shaft and holds the shaft such that rotation of the shaft is allowed,
    one of the lid and the main body includes a restriction portion that holds the lid such that the swing of the lid is restricted between the open position and the closed position, and
    the other one of the lid and the main body includes a restriction portion receiving portion that receives the restriction portion.

2. The wiring module of claim 1, wherein
    the restriction portion includes two or more restriction protrusions separated from each other in a rotating direction of the shaft on the shaft holder, and
    the restriction portion receiving portion includes a locking pawl included in a member that includes the shaft and locked between the restriction protrusions that are adjacent to each other.

3. The wiring module of claim 1, wherein
    the shaft holder includes:
        a receiving portion that receives the shaft; and
        a retainer configured not to be in contact with the member that includes the shaft at a position at which the shaft is received and to be in contact with the member that includes the shaft at a position at which removal of the shaft from the shaft holder is restricted.

* * * * *